US012568126B2

(12) United States Patent
Barakat et al.

(10) Patent No.: US 12,568,126 B2
(45) Date of Patent: Mar. 3, 2026

(54) SIP ROUTING ENGINE DATA

(71) Applicant: MICROSOFT TECHNOLOGY LICENSING, LLC, Redmond, WA (US)

(72) Inventors: Hassan Ali Hussein Barakat, London (GB); Salem Amin Al-Damluji, Chorleywood (GB); Thomas David Jinks, Enfield (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 343 days.

(21) Appl. No.: 18/123,051

(22) Filed: Mar. 17, 2023

(65) Prior Publication Data

US 2024/0251002 A1      Jul. 25, 2024

(51) Int. Cl.
| | |
|---|---|
| *H04L 12/66* | (2006.01) |
| *H04L 45/02* | (2022.01) |
| *H04L 45/302* | (2022.01) |
| *H04L 65/1104* | (2022.01) |

(52) U.S. Cl.
CPC .......... *H04L 65/1104* (2022.05); *H04L 45/02* (2013.01); *H04L 45/3065* (2013.01)

(58) Field of Classification Search
CPC ... H04L 45/22; H04L 45/125; H04L 65/1069; H04L 65/1104; H04L 65/1016; H04L 65/1046; H04L 63/0263; H04L 63/1408; H04L 45/3065; H04L 63/0227; H04L 69/22; H04L 65/1101; H04L 65/00; H04M 3/42357; H04M 15/08; H04M 15/58; H04M 15/8061; H04M 3/2218;

H04M 15/8214; H04M 3/2263; H04M 7/0075; H04M 2215/42; H04M 15/8044; H04M 15/8027; H04M 15/721; H04M 15/8221; H04M 7/128; H04M 3/42144; H04M 7/006; H04M 2207/12
See application file for complete search history.

(56) References Cited

U.S. PATENT DOCUMENTS

| | | | | |
|---|---|---|---|---|
| 10,965,722 | B1 * | 3/2021 | Yuan | .................... H04L 65/1045 |
| 2006/0274760 | A1 * | 12/2006 | Loher | .................... H04M 7/006 |
| | | | | 370/395.52 |
| 2012/0106727 | A1 * | 5/2012 | Kaushal | ............... H04Q 3/0016 |
| | | | | 379/211.01 |
| 2019/0045037 | A1 * | 2/2019 | Sukhomlinov | ....... G06F 9/5077 |
| 2020/0257579 | A1 * | 8/2020 | Shekhar | ................ H04L 45/306 |
| 2021/0194937 | A1 * | 6/2021 | Kinsey | .................. H04M 3/562 |

OTHER PUBLICATIONS

International Search Report and Written Opinion received for PCT Application No. PCT/US2024/010229, Mar. 20, 2024, 13 pages.
International Preliminary Report on Patentability Opinion received for PCT Application No. PCT/US2024/010229, Jul. 31, 2025, 8 pages.

* cited by examiner

*Primary Examiner* — Kharye Pope
(74) *Attorney, Agent, or Firm* — Han Gin; Newport IP, LLC

(57) ABSTRACT

A method implemented by a Session Initiation Protocol (SIP) Routing Engine (SRE) for collating and transmitting structured SIP route data of one or more SIP routes; a method implemented by a SRE engine for receiving and storing structured SIP route data; and a system comprising a first SRE and a second SRE, whereby SIP route data is transferred between the two.

18 Claims, 6 Drawing Sheets

300

301 <starting line>

302 <header field>

303 <separator>

304 <message body>

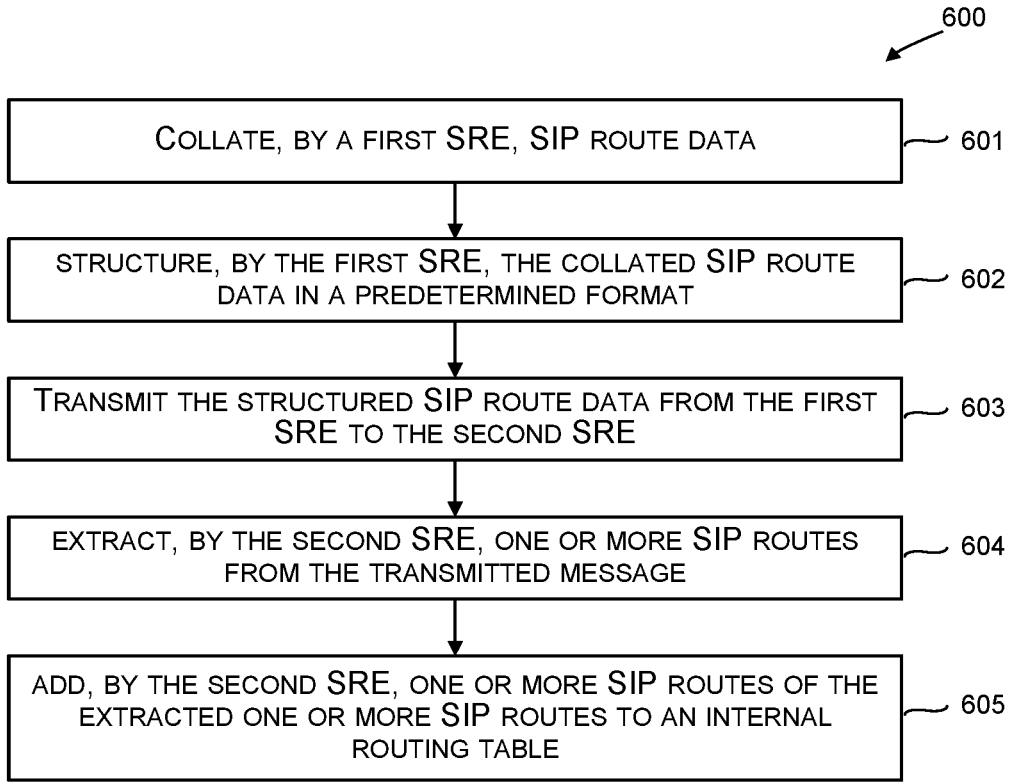

600

601 — COLLATE, BY A FIRST SRE, SIP ROUTE DATA

602 — STRUCTURE, BY THE FIRST SRE, THE COLLATED SIP ROUTE DATA IN A PREDETERMINED FORMAT

603 — TRANSMIT THE STRUCTURED SIP ROUTE DATA FROM THE FIRST SRE TO THE SECOND SRE

604 — EXTRACT, BY THE SECOND SRE, ONE OR MORE SIP ROUTES FROM THE TRANSMITTED MESSAGE

605 — ADD, BY THE SECOND SRE, ONE OR MORE SIP ROUTES OF THE EXTRACTED ONE OR MORE SIP ROUTES TO AN INTERNAL ROUTING TABLE

FIG. 6

SIP ROUTING ENGINE DATA

CROSS-REFERENCE TO RELATED APPLICATION(S)

This non-provisional utility application claims priority to UK patent application number 2300804.8 entitled "SIP ROUTING ENGINE DATA" and filed on Jan. 19, 2023, which is incorporated herein in its entirety by reference.

TECHNOLOGICAL FIELD

SIP routing engines. Specifically, sending SIP routing data from a SIP routing engine and receiving SIP routing data at a SIP routing engine.

BACKGROUND

Session Initiation Protocol (SIP) is a signaling protocol that is used to initiate, maintain, and terminate a communication session. The communication session may relate to voice, video and/or a messaging application, for example. SIP is commonly used in Internet telephony, private IP telephone systems and as mobile phone calling over LTE. A SIP routing engine (SRE) is a system that routes an incoming SIP call to a correct destination. The SRE has a database of routes and a logic configured to do the routing for the routes in the database of the SRE. A SRE may be part of or associated with one or more ISPs. A national phone operator (NPO) is a company that provides a telephone service locally within a country. One country may have multiple NPOs with each respective NPO owning a subset of the total phone numbers of the one country. An international service provider (ISP) is a service provider that provides an international SIP call service to one or more local country operators. An ISP may receive an international SIP call from a first NPO of a first country and route it to a second NPO of a second country, for example. An ISP uses an SRE to route SIP calls between NPOs and/or other ISPs.

A single ISP will not directly connect to all NPOs in the world. To overcome this, the single ISP may directly connect to a subset of the NPOs covering some parts of the world and rely on other ISPs to provide connections to other parts of the world that the single ISP doesn't directly connect to. In the world there are a large number of ISPs and an international SIP call from an originating NPO can complete many hops between different ISPs before the call reaches a final destination NPO. To aid routing of a call, an ISP may have a SRE as a core routing system that the ISP uses to route calls between NPOs or other ISPs to enable an international call to reach an intermediate or final destination.

A SIP call is routed internationally based on a destination number prefix that the call sender is trying to reach. For each number prefix, there can be many possible routes, each possible route with a different audio quality, a different number of hops, or a other criteria. Depending on an agreement a NPO or an ISP has with a call sender and what a next hop would be, the NPO or the IPS may, for example, decide to route the call to via a high-quality route, or a low-quality route, or not route the call.

4G and 5G are fourth and fifth generations of broadband cellular network technology. A call routed via a SIP network may be from and/or to a 4G or 5G endpoint, such as a handheld cellular device.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A first aspect of the invention is a method implemented by a session initiation protocol (SIP) routing engine for transmitting structured SIP route data. The method comprising: collating SIP route data, the SIP route data comprising one or more SIP routes, each respective SIP route of the one or more SIP routes comprises endpoints of the respective route, each endpoint being national phone operator (NPO) endpoint or an international service provider (ISP) endpoint; structuring the collated SIP route data in a predetermined format to produce structured SIP route data; generating a message comprising the structured SIP route data; and transmitting the generated message according to a predetermined schedule.

A second aspect of the invention is a method implemented by a session initiation protocol (SIP) routing engine for receiving structured SIP route data. The method comprising: receiving a message, the received message comprises structured SIP route data in a predetermined format; extracting one or more SIP routes from the received message, each respective SIP route of the one or more SIP routes comprises endpoints of the respective route, each endpoint being national phone operator (NPO) endpoint or an international service provider (ISP) endpoint; and adding the extracted one or more SIP routes to an internal routing table of the SIP routing engine (SRE).

A third aspect of the invention is a computerized system comprising a first session initiation protocol (SIP) routing engine (SRE) comprising one or more processors, and a second SRE comprising one or more processors. The system is configured to: collate, by the first SRE, SIP route data, SIP route data comprising one or more SIP routes, each respective SIP route of the one or more SIP routes comprises endpoints of the respective route, each endpoint being national phone operator (NPO) endpoint or an international service provider (ISP) endpoint; structure, by the first SRE, the collated SIP route data in a predetermined format to produce structured SIP route data; transmit, by the first SRE, a message comprising the structured SIP route data to the second SRE according to a predetermined schedule; extract, by the second SRE, one or more SIP routes from the transmitted message; and add, by the second SRE, one or more SIP routes of the extracted one or more SIP routes to an internal routing table of the second SRE.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 illustrates a flow diagram of a system comprising a first SRE transmitting structured SIP route data to a second SRE.

Like reference numerals are used to designate like parts in the accompanying drawings.

DETAILED DESCRIPTION

A SIP routing engine (SRE) transmitting structured SIP route data in a message containing structured routing information that was gathered and by the SRE provides an improved way of disseminating SIP routing information through a network. The automatic sending of the automated routing information message at a predetermined schedule ensures that accurate and up to date routing information is shared across a network thereby reducing dropped calls and avoiding calls that cannot connect. Also, the up-to-date routing information means that calls will be routed via the most appropriate path which will increase the overall efficiency of the network enabling greater call capacity. The automatic receipt by an SRE of a routing information message and the updating of the SRE's internal routing table with the received routing information propagates accurate routing information. The SRE, after receiving the message, can then send to a further SRE/entity routing information including both the received routing information and additional routing information that was already present in the SRE routing table. Alternatively or additionally, the SRE, after receiving the message, can automatically respond to the original sending SRE with a message containing additional routing information that was already present in the receiving SRE routing table so that routing information flows in multiple directions across the network.

Calls routed over a SIP network by one or more SREs may flow from and/or to a wireless device as an endpoint. The wireless device may transmit the call over a wireless connection using cellular network technology such as 4G or 5G.

The detailed description provided below in connection with the appended drawings is intended as a description of the present examples and is not intended to represent the only forms in which the present examples are constructed or utilized. The description sets forth the functions of the examples and the sequence of operations for constructing and operating the examples. However, the same or equivalent functions and sequences may be accomplished by different examples.

Although the present examples are described and illustrated herein as being methods or implemented in a system, the methods and systems described herein are provided as an example and not a limitation. As those skilled in the art will appreciate, the present examples are suitable for application in a variety of different types of methods, computer readable mediums, and systems.

Figure 1:
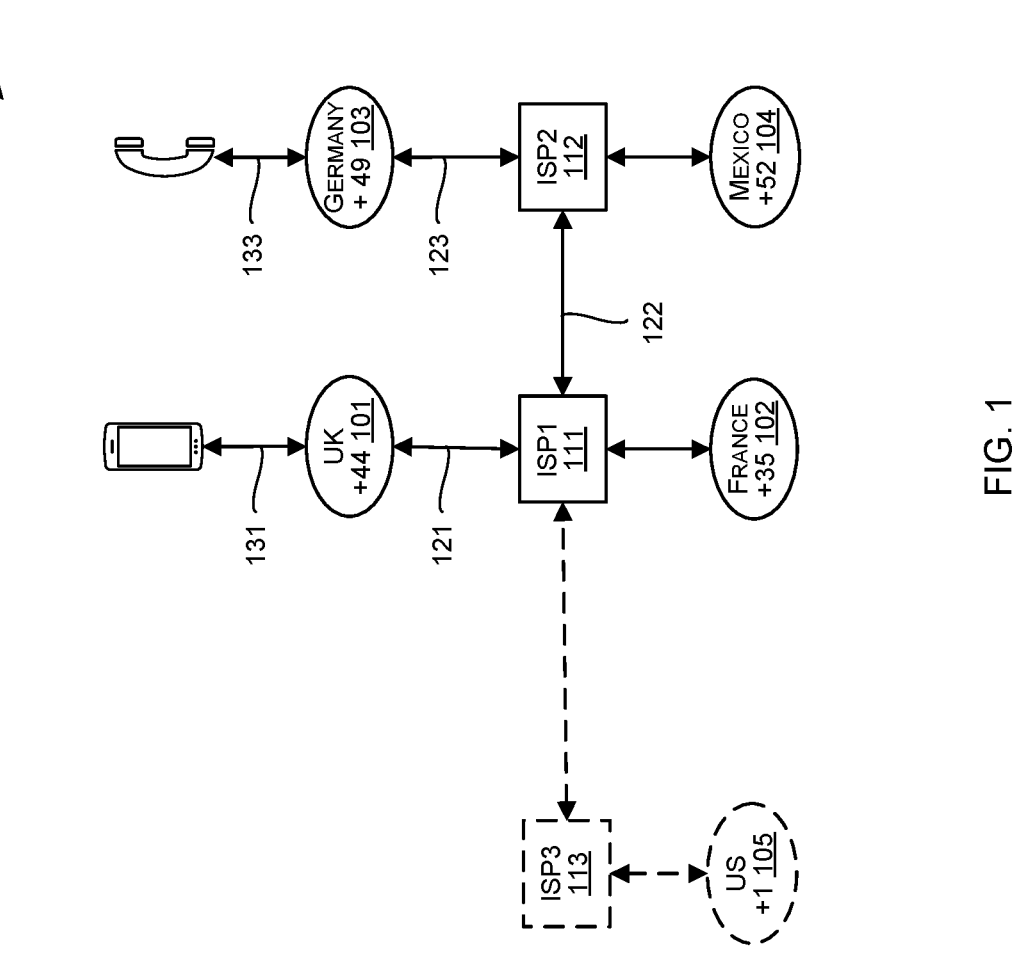
FIG. 1 illustrates a schematic diagram of a call routing system.

FIG. 1 illustrates a schematic diagram of a call routing system 100. In solid lines are a first international service provider (ISP1) 111 and a second international service provider (ISP2) 112. ISP1 and ISP2 are directly connected 122 to each other, i.e., data is transmissible between ISP1 and ISP2. Illustrated ISPs that are directly connected may signify that they belong to and/or are operated by separate entity that have a service agreement between the two and/or calls are routable between the two ISPs 111, 112.

In solid lines are further illustrated four national phone operators (NPOs) with each NPO routing to all telephone numbers of the indicated country. A first NPO 101 is for telephone numbers of the UK, i.e., telephone numbers that begin with a country code of +44, a second NPO 102 is for telephone numbers of France which begin with a country code of +35, a third NPO 103 is for telephone numbers of Germany which begin with a country code of +39, and a third NPO 104 is for telephone numbers of Mexico which begin with a country code of +52. ISP1 111 can route calls to UK and French telephone numbers, while ISP2 112 can route calls to German and Mexican telephone numbers. Two telephone endpoints are illustrated in FIG. 1: a UK telephone endpoint 131 connected to the first NPO 101 via a UK national connection 131, and a German telephone endpoint 133 connected to the third NPO 103 via a German national connection 133.

The UK telephone endpoint 131 may be a wireless/cellular device that comprises a modem that incorporates 4G and/or 5G technology. For example, a call can originate at a 5G enabled endpoint and the call data be transmitted wirelessly using voice over 5G to a base station before the call data is routed over a SIP network comprising an NPO and a ISP.

In order for an ISP to route calls appropriately, the ISP has an associated SIP routing engine (SRE), not illustrated separately in FIG. 1, that includes information in at least one routing table for next hops that call data can take. The next hops may be direct connections to ISPs owned and/or operated by the same entity or another entity. In the examples described herein, a direct connection between two entities means that the two entities have established an agreement for routing media, for example telephone calls, therebetween. An entity, such as an SRE, may include a list or database of other entities that a direct connection is maintained with that may be reviewed when deciding whether to share routing information with a specific other entity, i.e., routing is only shared with direct connections listed in the list/database. Further, routing information related to a second ISP that is held by a first ISP (or corresponding SRE) is not to be sent to the second ISP (or corresponding SRE) because the second ISP (or corresponding SRE) would have been the source of that information.

It is important for an SRE to contain up-to-date routing information so that the most efficient routing can be made by an associated ISP. Using out-of-date routing information could cause an ISP to route data over non-valid next hop whereby call data will be dropped before it reaches a destination. It is also an aim to transmit data over a smaller number of hops, over a connection with an appropriate quality of service to efficiently utilise available channels and connections, which may relate to a measured audio quality for the route an audio quality of a codex used by the route, and/or some other criteria.

To improve routing performance, routing data should be kept up to date, which may be performed by messaging up-to-date routing data between SREs, i.e., between ISP1 and ISP2 of FIG. 1. Below is exemplary routing information 1 for ISP1 presented in a standardised manner using, in this example, a JSON format. Other formats, both human readable and non-human readable, may also be used.

```
{
    "routes": [
        "Route to +44": [
            {
                "QoS": "low",
                "domain": "ISP1 domain",
```

-continued

```
            "Hops": 0
        }
    ],
    "Route to +35": [
        {
            "QoS": "high",
            "domain": "ISP1 domain",
            "Hops": 0
        }
    ]
}
```

Figure 2:
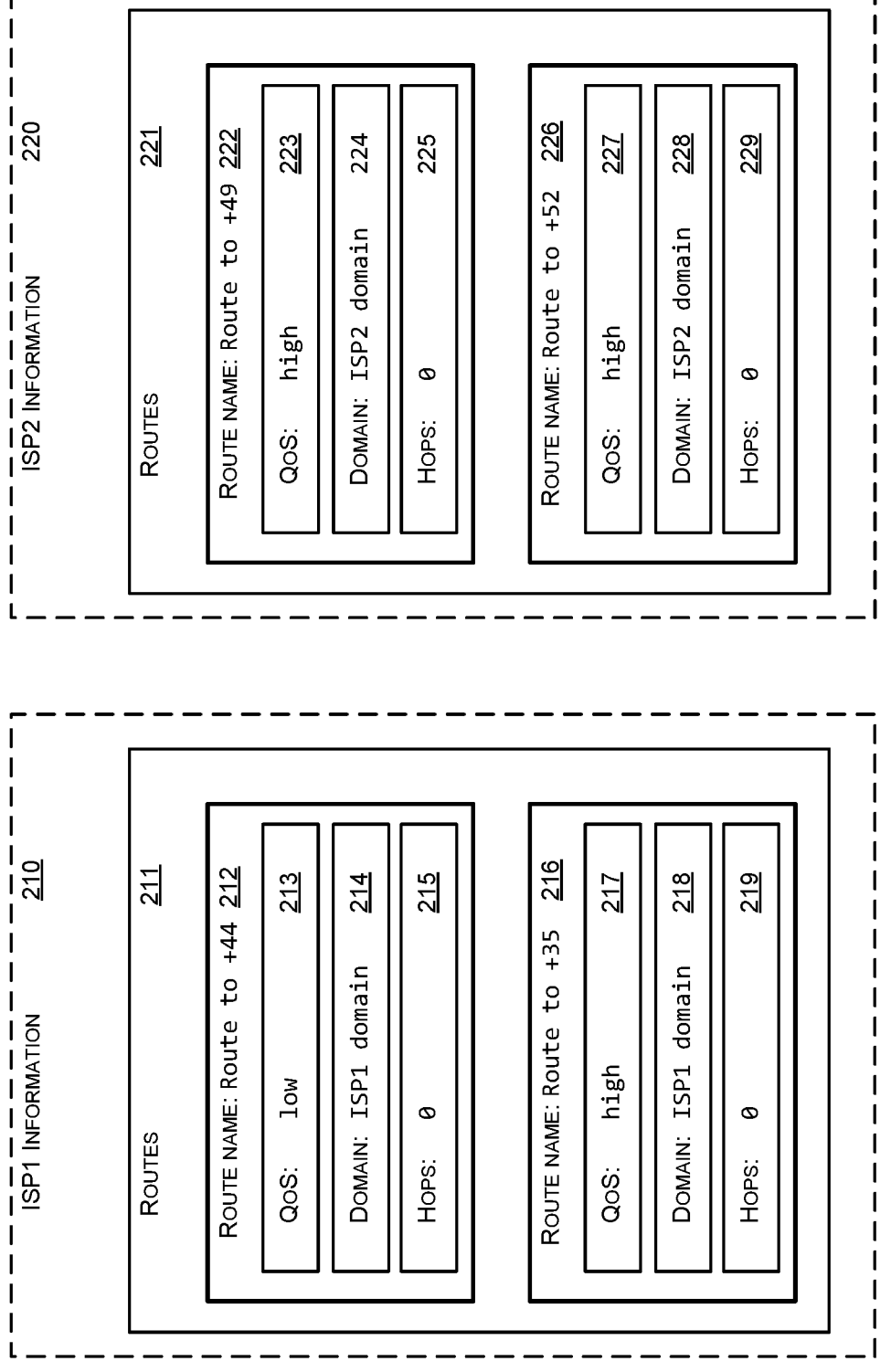
FIG. 2 illustrates transmitted route data.

The above ISP1 routing information 210 is illustrated in FIG. 2 and presents information on the two NPOs 101, 102 that ISP1 has a direct connection with. The routing information for each NPO includes an indication of a range of telephone numbers 212, 216 reachable, an indication of a quality of service (QoS) 213, 217, an indication of a domain 214, 218 and an indication of a number of hops 215, 219 between ISP1 and the relevant NPO. The domain field contains a domain name of a next hop that a call should be sent to if the route was selected. In the examples of FIG. 1, for simplicity the indication of a range of telephone numbers reachable relate to an entire country however this may be a subset of an entire country's phone numbers.

The above ISP1 routing information may be stored by an SRE associated with ISP1. Further, the SRE may transmit the ISP1 routing information to another SRE so that other SRE can route data through ISP1 and thereby to UK NPO 101 or France NPO 102. The routing information may be sent to the other SRE automatically at regular intervals, automatically when some aspect of the routing information of ISP1 changes or be triggered in another manner. Automatic transmittal of ISP1 information to ISP2 enables an SRE associated with ISP2 to add/remove/update routing inflation from its own databases and selectively route calls to ISP1 based on the up-to-date routing information.

ISP2 may automatically provide to ISP1, via an SRE associated with ISP2, regular routing information for NPO (s) connected to ISP2. The sending of routing information may be performed regularly or may be triggered by a specific event such as receipt of routing data from another entity on a network. Note the ISP1 and ISP2 do not connect to other ISPs in the example of FIG. 1 with objects in solid lines. Because of that, no routing information of other ISPs is sent between ISP1 and ISP2 because sending data to ISP1 relating to ISP1 would mean sending redundant information.

Below is exemplary routing information 2 for ISP2 presented in the standardised manner.

```
{
    "routes": [
        "Route to +49": [
            {
                "QoS": "high",
                "domain": "ISP2 domain",
                "Hops": 0
            }
        ],
        "Route to +52": [
            {
                "QoS": "high",
                "domain": "ISP2 domain",
                "Hops": 0
```

-continued

```
            }
        ]
    ]
}
```

The above ISP2 routing information 220 is illustrated in FIG. 2 and presents information on the two NPOs 103, 104 that ISP2 has a direct connection with. The routing information for each NPO includes an indication of a range of telephone numbers 222, 226 reachable, an indication of a quality of service (QoS) 223, 227, an indication of a and an indication of a number of hops 225, 229 between ISP2 and the relevant NPO.

Now, the features of FIG. 1 illustrated with dotted lines are considered to be connected to the features of FIG. 1 illustrated with solid lines. In this example, a further ISP, ISP3 113, has connected to ISP1 as a direct connection (and to ISP2 via a one hop connection). ISP1 will send routing information to ISP3 so that ISP3 can promptly route data through ISP1 to onward network(s) and an endpoint.

Below is exemplary routing information 3 for ISP1 sent to ISP3 presented in the standardised manner.

```
{
    "routes": [
        "Route to +44": [
            {
                "QoS": "low",
                "domain": "ISP1 domain",
                "Hops": 0
            }
        ],
        "Route to +35": [
            {
                "QoS": "high",
                "domain": "ISP1 domain",
                "Hops": 0
            }
        ],
        "Route to +49": [
            {
                "QoS": "high",
                "domain": "ISP1 domain",
                "Hops": 1
            }
        ],
        "Route to +52": [
            {
                "QoS": "high",
                "domain": "ISP1 domain",
                "Hops": 1
            }
        ]
    ]
}
```

In the above routing information for ISP1 sent to ISP3, ISP1 provides all number prefixes that are reachable by ISP1 either directly, or indirectly through ISP2. The domain field indicates ISP1 because call data to any of the listed routes must pass through ISP 1, e.g., a telephone call from ISP3 to a +52 prefix must pass through ISP1 prior to ISP2 in order to reach the Mexico NPO 104. Upon receipt of the routing information from ISP1, ISP3 may store the information in an associated routing table so that an SIRE of ISP3 can route calls through ISP1.

As described above, connections and routes may change. This means that an update of routing information can sent from an ISP (or associated SRE) to other ISPs so that all ISPs have the most up to date routing information therefore traffic is directed over the most efficient routes and fewer packets are dropped due to an ISP attempting to route traffic over a non-current path. It is not just an entire route that may be added or removed, e.g., because an ISP can no longer deliver to a number prefix, but also characteristics of the route may change, such as the codec supported by a route, the number of hops required to reach a destination, etc. Transmitting of routing information as described herein enables quick and accurate transmission of up-to-date routing information and may be performed automatically by or on behalf of an ISP at scheduled intervals, e.g., every minute, when a routing change is detected and/or when updated routing information is received. An ISP receiving routing information can update an associated SRE and its routing table.

A further example based on FIG. 1 is if ISP2 removes the route to prefix +49 or that route is no longer available to ISP2, the associated SRE's routing information is updated to remove the route. The next time ISP2 is sending routing data to ISP1, it will remove NPO prefix +49 from its routing information. Below is exemplary routing information 4 for ISP2 sent to ISP1 after NPO prefix +49 is removed, presented in the standardised manner.

```
{
    "routes": [
        "Route to +52": [
            {
                "QoS": "high",
                "domain": "ISP2 domain",
                "Hops": 0
            }
        ]
    ]
}
```

ISP1 will receive the updated routing information from ISP2 and ISP1's associated SRE will receive the updated routing information and update its routing table. The ISP2 route to prefix +49 routing information will be removed from the SRE routing table and, either immediately or at a scheduled time, ISP1 will send updated routing information to ISP3—below is exemplary routing information presented in the standardised manner.

```
{
    "routes": [
        "Route to +44": [
            {
                "QoS": "low",
                "domain": "ISP1 domain",
                "Hops": 0
            }
        ],
        "Route to +35": [
            {
                "QoS": "high",
                "domain": "ISP1 domain",
                "Hops": 0
            }
        ],
        "Route to +52": [
            {
                "QoS": "high",
                "domain": "ISP1 domain",
                "Hops": 1
            }
        ]
    ]
}
```

ISP3 will receive the above routing information from ISP1 and a routing table associated with ISP3 will be updated whereby the route to +49 will be removed and therefore not be used anymore by ISP3.

Figure 3:
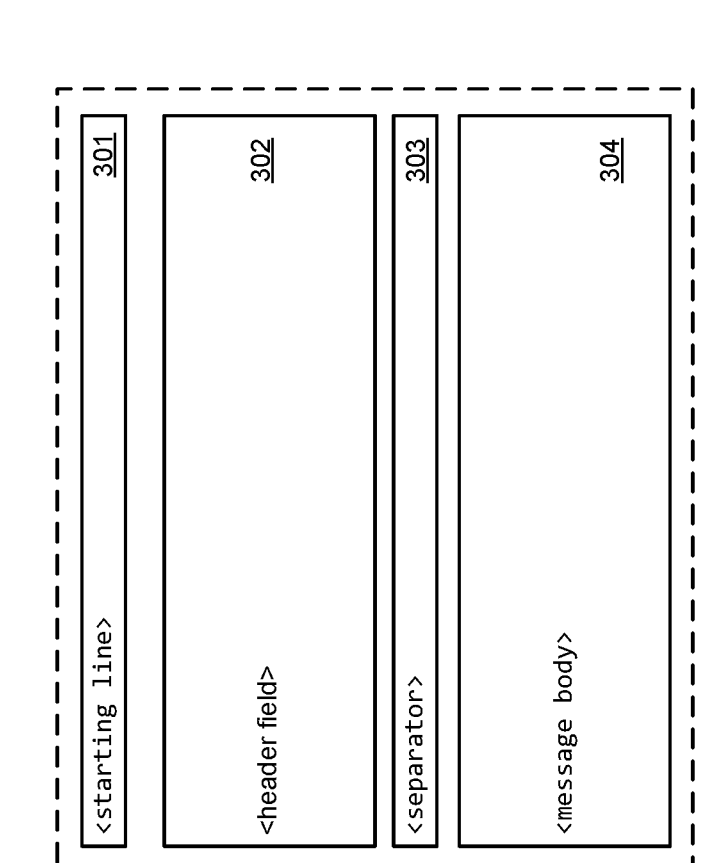
FIG. 3 illustrates a schematic diagram of an message.

FIG. 3 illustrates a schematic diagram of a SIP message 300 as an example of how the routing information may be transmitted. The SIP message 300 may comprise four main parts: a starting line 301, sometimes referred to as an opening line, that defines the request and provides a Uniform Resource Identifier (URI) for where the request is to be sent; a header field 301 that conveys information about the message; a separator 303 of a blank line; and a message body 304 to contain routing information. The SIP message may be sent as a request, such as an Options type request, or a Message type request.

Other type of electronic messages, other than SIP messages, may convey routing information between network entities.

Figure 4:
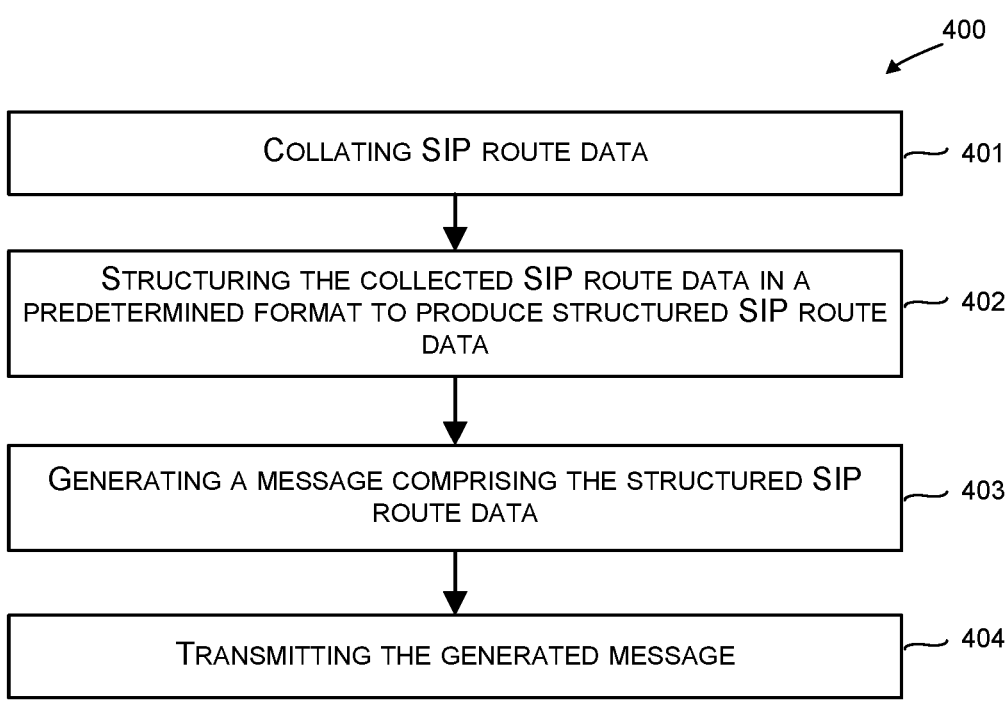
FIG. 4 illustrates a flow diagram of a method implement by a first SRE for transmitting structured SIP route data.

FIG. 4 illustrates a flow diagram of a method 400 implement by a first SIRE for transmitting structured SIP route data. Method 400 is implemented by a SIRE for transmitting structured SIP route data. Bloc 401 recites "Collating SIP route data" and relates to collating SIP route data, the SIP route data comprising one or more SIP routes, each respective SIP route of the one or more SIP routes comprises endpoints of the respective route, each endpoint being national phone operator (NPO) endpoint or an international service provider (ISP) endpoint. Block 402 relates to structuring the collated SIP route data in a predetermined format to produce structured SIP route data. Block 403 relates to generating a message comprising the structured SIP route data. Block 404 relates to transmitting generated message.

The method may performed regularly or in response to a particular trigger, such as receiving a transmission of route data or in response to a new direct connection for an ISP or NPO.

The method may be performed automatically by the SRE, i.e. the method may be fully automated by the SRE increasing accuracy and the frequency the route data to be transmitted.

The generated message may have a destination address of a second SRE thereby routing tables of respective SREs can be updated directly rather than relying on route data to be forwarded to SREs. This feature enables route information to spread across a SIP network quickly thereby increasing the efficiency of the network and reducing dropped data.

A media data session may active between a first SRE and a second SRE prior to the first SRE transmitting a generated message containing route data to the second SRE. The method of FIG. 4 can be performed on a live network to increase performance of the network without requiring any network downtime.

By transmitting structured route data is in the body of a SIP message, any SIP network is able to send route data as SIP messages have an established protocol.

The structured SIP route data may be one or more of: a range of addresses applicable to a respective SIP route; a range of telephone numbers applicable to a respective SIP route; an indication of a quality of service applicable to a respective SIP route; an indication of a codec used to transmit data over a respective SIP route; an address or domain of a next hop that a SRE is to use to send traffic over a respective SIP route; and/or an indication of a number of hops from an endpoint of a respective SIP route to a destination address. Additional route information can, nonetheless, be further included in the route data.

In one example, the method includes comparing a criteria of one or more SIP routes against criteria of a policy; and selectively, based on the comparison, including in the structured SIP route data one or more SIP routes that meet the criteria of the policy. The policy may reflect security provisions to enable the control of flow of route data information to third parties. An SRE is not always required to transmit all the routes stored in the SRE routing table to another SRE. An SRE will may only transmit to another SRE the route data corresponding to routes selected to be transmitted. To facilitate this, an SRE may create a sharing policy for one, more or all other SREs. The policy controls what route data to share. These policy rules help in giving the SREs more control and flexibility in their service they are providing. It also provides security, since it protects against a bad actor advertising connectivity to an endpoint that is does not actually provide connectivity to The compared criteria may relate to one or more of: a range of addresses; a range of telephone numbers; a quality of service; a codec; an address or domain of a next hop; and/or an indication of a number of hops. The policy may be associated with an SRE located at or reachable via the destination address.

The SIP route data transmitted in the message may be a subset of the total SIP route data stored by the first SRE. Further, the selection of SIP routes for transmission in the message to the second SRE may be dependent upon an identify of the second SRE. A specific SRE or a select group of SREs may receive reduced data to ensure network security.

Figure 5:
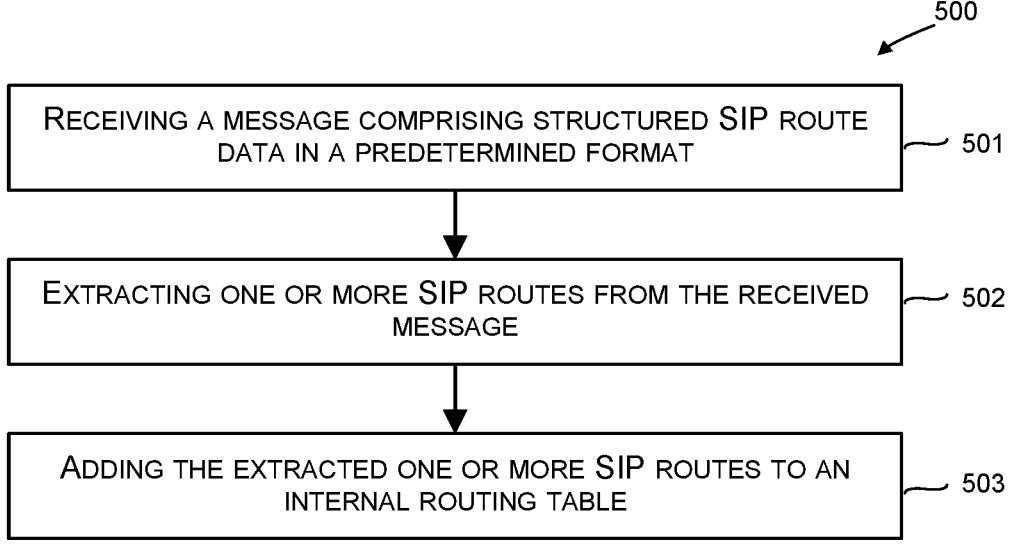
FIG. 5 illustrates a flow diagram of a method implement by a second SRE for receiving structured SIP route data.
Figure 7:
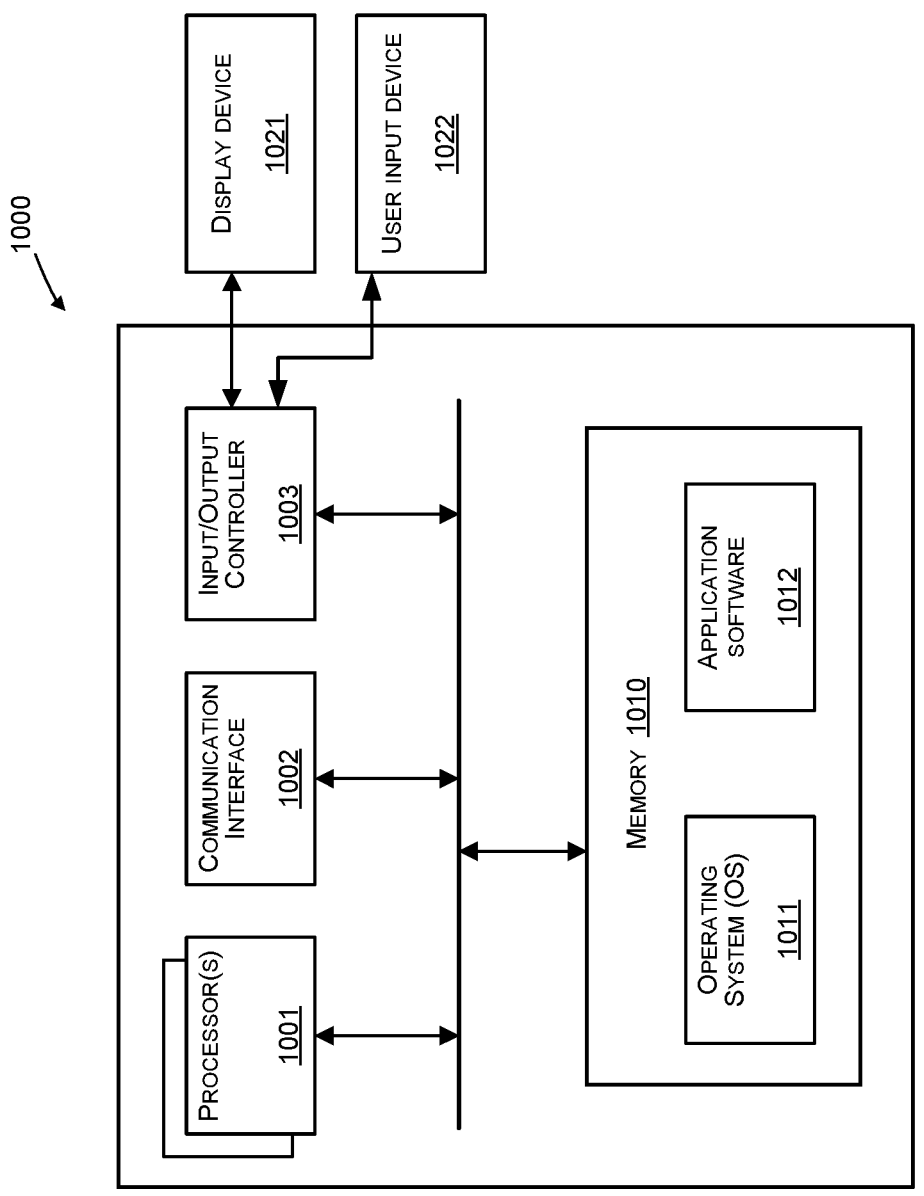
FIG. 7 illustrates an exemplary computing-based device suitable to implemented methods, systems or parts therefore disclosed herein.

FIG. 5 illustrates a flow diagram of a method 500 implement by a second SRE for receiving structured SIP route data. The method 500 comprises receiving 501 a message, the received message comprises structured SIP route data in a predetermined format; extracting 502 one or more SIP routes from the received message; and adding 503 the extracted one or more SIP routes to an internal routing table of the SIP routing engine (SRE). Each respective SIP route of the one or more SIP routes may comprise endpoints of the respective route, and each endpoint may be an NPO endpoint or an ISP endpoint.

The received message may be a SIP message and the structured SIP route data is in the body of the SIP message as described above in relation to FIG. 4.

Further as described above in relation to FIG. 4, the structured SIP route data may comprise a range of telephone numbers applicable to a respective SIP route; an indication of a quality of service applicable to a respective SIP route; an indication of a codec used to transmit data over a respective SIP route; an address or domain of a next hop that a SRE is to use to send traffic over a respective SIP route; and/or an indication of a number of hops from an endpoint of a respective SIP route to a destination address.

The method may include comparing criteria of the extracted one or more SIP routes against criteria of a policy; and selectively, based on the comparison adding the compared one or more SIP routes that meet the criteria of the policy to the internal routing table of the SRE. In this way, not all received route data is added to a SRE routing table. An SRE is not required to add all received route data to a routing table. To facilitate this, an SRE may create an acceptance policy for one, more or all other SREs. The policies controls what received route data to share to or to add to a routing table. These policy rules help in giving the SREs more control and flexibility in their service they are providing. It also provides security, since it protects against a third-party advertising connectivity to a destination that is will not provide connectivity to.

The compared criteria relates to one or more of: a range of addresses; a range of telephone numbers; a quality of service; a codec; an address or domain of a next hop; and/or an indication of a number of hops. A plurality of SIP routes may be extracted from the received message, but only a subset of the extracted plurality of SIP routes may be added to the internal routing table of the SRE. Any deemed not required, not current, not secure, etc, may be discarded.

The methods and systems discussed herein are secure because endpoints such as ISPs and NPOs do not discover unknown direct connections through the described process, i.e., an SRE will transmit routes only to other SREs or a NPO known to the transmitting SRE. Also, an SRE receiving route information from a party not known to it is not required to add the received route information to the SRE routing table. Further, the optional use of SIP messages to send and receive route information enables the additional security available to SIP messaging systems to ensure that identities can be trusted when sending or receiving SIP messages containing route information.

A further benefit of the invention is that invalid routes can be identified by an entity, such as an ISP and an associated routing engine can immediately remove the invalid route information from its routing table, and quickly and securely distribute the update to direct connections who then can also remove the invalid route information automatically. The withdrawal of an invalid route can thereby be propagated quickly through a network and be automatically processed.

The methods and systems disclosed herein allow efficient route sharing between ISPs, which may have thousands of routes stored in their routing tables. Route sharing may also occur between an ISP (specifically an SRE of the ISP) and a NPO whereby the NPO uses the received route information to populate a NPO SRE and thereby route international calls to the ISP.

FIG. 6 illustrates a flow diagram of a system comprising a first SRE transmitting structured SIP route data to a second SRE. A computerized system comprising a first SRE comprising one or more processors, and a second SRE comprising one or more processors. The system is configured to: collate 601, by the first SRE, SIP route data, SIP route data comprising one or more SIP routes; structure 602, by the first SRE, the collated SIP route data in a predetermined format to produce structured SIP route data; transmit 603, by the first SRE, a message comprising the structured SIP route data to the second SRE; extract 604, by the second SRE, one or more SIP routes from the transmitted message; and add 605, by the second SRE, one or more SIP routes of the extracted one or more SIP routes to an internal routing table of the second SRE. Each respective SIP route of the one or more SIP routes may comprise endpoints of the respective route, and each endpoint may be a NPO endpoint or an ISP endpoint.

The first SRE and/or the second SRE may be at least partially implemented using hardware logic selected from any one or more of: a field-programmable gate array, a program-specific integrated circuit, a program-specific standard product, a system-on-a-chip, a complex programmable logic device.

A system may also include a combination of the methods illustrated in FIGS. 4 and 5.

The methods, systems and flow charts disclosed herein may form at least part of one or more protocols for communication to/from an SRE to update route data. In one example, the protocol is a SIP protocol, and, in another example, the protocol is a SIP call routing protocol. The example protocols may define a set of rules for formatting SIP route data and/or processing received SIP route data. The protocol may be used for communication between SREs in an automated manner whereby SIP route data is shared in a predetermined structured format readable by a recipient.

In examples described herein it is described that structured SIP route data comprises one or more of a range of addresses applicable to a respective SIP route, a range of telephone numbers applicable to a respective SIP route, an indication of a quality of service applicable to a respective SIP route, an indication of a codec used to transmit data over a respective SIP route, an address or domain of a next hop that a SRE is to use to transmit traffic over a respective SIP route, and/or an indication of a number of hops from an endpoint of a respective SIP route to a destination address. However, in specific examples, structured SIP route data comprises a range of telephone numbers applicable to the SIP route, and an address or domain of a next hop that a SRE to transmit traffic over the SIP route.

Alternatively, an SRE may include an API for transmitting or receiving route data to/from another SRE according to the methods and systems disclosed herein.

FIG. 8 illustrates an exemplary computing-based device suitable to implemented methods, systems or parts therefore disclosed herein. Specifically, FIG. 8 illustrates various components of an exemplary computing-based device 1000 which are implemented as any form of a computing and/or electronic device, and in which above-described examples are implemented.

Computing-based device 1000 comprises one or more processors 1001 which are microprocessors, controllers or any other suitable type of processors for processing computer executable instructions to control the operation of the device in order to. In some examples, for example where a system on a chip architecture is used, the processors 1001 include one or more fixed function blocks (also referred to as accelerators) which implement a part of the methods in hardware (rather than software or firmware). Platform software comprising an operating system 1011 or any other suitable platform software is provided at the computing-based device to enable application software 1012 to be executed on the device.

The computer executable instructions are provided using any computer-readable media that is accessible by computing based device 1000. Computer-readable media includes, for example, computer storage media such as memory 1010 and communications media. Computer storage media, such as memory 1010, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1010) is shown within the computing-based device 1000 it will be appreciated that the storage is, in some examples, distributed or located remotely and accessed via a network or other communication link (e.g., using communication interface 1002).

The computing-based device 1000 also comprises an input/output controller 1003 configured to output display information to a display device 1021 which may be separate from or integral to the computing-based device 1000. The display information may provide a graphical user interface. The input/output controller 1003 is also configured to receive and process input from one or more devices, such as a user input device 1022 (e.g., a mouse, keyboard, camera, microphone or other sensor).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g., in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e., at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

What is claimed is:

1. A method implemented by a session initiation protocol (SIP) routing engine (SRE) for transmitting structured SIP route data, the method comprising:
   collating SIP route data, the SIP route data comprising one or more SIP routes including next hops that call data can take, each respective SIP route of the one or more SIP routes comprising endpoints of the respective SIP route, each endpoint being a national phone operator (NPO) endpoint or an international service provider (ISP) endpoint;
   structuring the collated SIP route data in a predetermined format to produce structured SIP route data;
   generating a message comprising the structured SIP route data; and
   transmitting the generated message according to a predetermined schedule to an SRE of the NPO or ISP, wherein the SIP route data includes current routing information that enables the NPO or ISP to route data over a reduced number of hops or through a connection that satisfies a target quality of service;
   wherein the structured SIP route data comprises one or more of:
      a range of addresses applicable to a respective SIP route;
      a range of telephone numbers applicable to the respective SIP route;
      an indication of a quality of service applicable to the respective SIP route;
      an indication of a codec used to transmit data over the respective SIP route;
      an address or domain of a next hop that a SRE is to use to transmit traffic over the respective SIP route; or
      an indication of a number of hops from an endpoint of the respective SIP route to a destination address.

2. The method of claim 1, wherein the method is performed automatically by the SIP routing engine (SRE).

3. The method of claim 1, wherein the SIP routing engine is operable to route a call that originated on a 5G network.

4. The method of claim 1, wherein
   the SRE is a first SRE;
   the generated message has a destination address of a second SRE; and
   a media data session is active between the first SRE and the second SRE prior to the first SRE transmitting the generated message to the second SRE.

5. The method of claim 1, wherein
   the generated message is a SIP message, and
   the structured SIP route data is in a body of the SIP message.

6. The method of claim 1 further comprising:
   comparing criteria of one or more SIP routes against criteria of a policy; and
   selectively, based on the comparison, including in the structured SIP route data one or more SIP routes that meet the criteria of the policy.

7. The method of claim 6, wherein
   the SRE is a first SRE, and
   the policy is associated with a second SRE located at or reachable via a destination address.

8. The method of claim 7, wherein
   the SIP route data transmitted in the message is a subset of the total SIP route data stored by the first SRE; and
   the selection of SIP routes for transmission in the message to the second SRE is dependent upon an identify of the second SRE.

9. The method of claim 6, wherein the compared criteria relates to one or more of:
   a range of addresses;
   a range of telephone numbers;
   a quality of service;
   a codec;
   an address or domain of a next hop; or
   an indication of a number of hops.

10. The method of claim 1, wherein the method is at least partially implemented in a SIP routing engine using hardware logic selected from any one or more of: a field-programmable gate array, a program-specific integrated circuit, a program-specific standard product, a system-on-a-chip, or a complex programmable logic device.

11. A method implemented by a session initiation protocol (SIP) routing engine for receiving structured SIP route data, the method comprising:
   receiving a message, the received message comprising structured SIP route data in a predetermined format;
   extracting one or more SIP routes from the received message, each respective SIP route of the one or more SIP routes comprising endpoints of the respective route including next hops that call data can take, each endpoint being a national phone operator (NPO) endpoint or an international service provider (ISP) endpoint; and
   adding the extracted one or more SIP routes to an internal routing table of the SIP routing engine (SRE), wherein the SRE is of a NPO or ISP, wherein the SIP route data includes current routing information is usable by the NPO or ISP to route data over a reduced number of hops or through a connection that satisfies a target quality of service;
   wherein the structured SIP route data comprises one or more of:
      a range of addresses applicable to a respective SIP route;
      a range of telephone numbers applicable to the respective SIP route;

an indication of a quality of service applicable to the respective SIP route;

an indication of a codec used to transmit data over the respective SIP route;

an address or domain of a next hop that a SRE is to use to transmit traffic over the respective SIP route; or an indication of a number of hops from an endpoint of the respective SIP route to a destination address.

12. The method of claim 11, wherein the received message is a SIP message and the structured SIP route data is in a body of the SIP message.

13. The method of claim 11 further comprising:

comparing criteria of the extracted one or more SIP routes against criteria of a policy; and selectively, based on the comparison adding the compared one or more SIP routes that meet the criteria of the policy to the internal routing table of the SRE.

14. The method of claim 13, wherein the compared criteria relates to one or more of:

a range of addresses;

a range of telephone numbers;

a quality of service;

a codec;

an address or domain of a next hop; or an indication of a number of hops.

15. The method of claim 11, wherein a plurality of SIP routes are extracted from the received message, and a subset of the extracted plurality of SIP routes are added to the internal routing table of the SRE.

16. The method of claim 11, wherein the method is at least partially implemented in a SIP routing engine using hardware logic selected from any one or more of: a field-programmable gate array, a program-specific integrated circuit, a program-specific standard product, a system-on-a-chip, and/or a complex programmable logic device.

17. A computerized system comprising a first session initiation protocol (SIP) routing engine (SRE) comprising one or more processors, and a second SRE comprising one or more processors, wherein the system is configured to:

collate, by the first SRE, SIP route data, SIP route data comprising one or more SIP routes including next hops that call data can take, each respective SIP route of the one or more SIP routes comprising endpoints of the respective route, each endpoint being a national phone operator (NPO) endpoint or an international service provider (ISP) endpoint;

structure, by the first SRE, the collated SIP route data in a predetermined format to produce structured SIP route data;

transmit, by the first SRE, a message comprising the structured SIP route data to the second SRE according to a predetermined schedule;

extract, by the second SRE, one or more SIP routes from the transmitted message; and add, by the second SRE, one or more SIP routes of the extracted one or more SIP routes to an internal routing table of the second SRE, wherein the second SRE is of the NPO or ISP, wherein the SIP route data includes current routing information is usable by the NPO or ISP to route data over a reduced number of hops or through a connection that satisfies a target quality of service;

wherein the structured SIP route data comprises one or more of:

a range of addresses applicable to a respective SIP route;

a range of telephone numbers applicable to the respective SIP route;

an indication of a quality of service applicable to the respective SIP route;

an indication of a codec used to transmit data over the respective SIP route;

an address or domain of a next hop that a SRE is to use to transmit traffic over the respective SIP route; or an indication of a number of hops from an endpoint of the respective SIP route to a destination address.

18. The computerized system of claim 17, wherein the first SRE or the second SRE is at least partially implemented using hardware logic selected from any one or more of: a field-programmable gate array, a program-specific integrated circuit, a program-specific standard product, a system-on-a-chip, a complex programmable logic device.

\* \* \* \* \*